US006669566B2

(12) United States Patent  
Iijima et al.

(10) Patent No.: US 6,669,566 B2
(45) Date of Patent: Dec. 30, 2003

(54) VIDEO GAME APPARATUS AND METHOD FOR UNIQUELY ENABLING PLAY OF MULTIPLE GAMES

(75) Inventors: Yutaka Iijima, Kyoto (JP); Takuma Matsunada, Kyoto (JP); Takao Ohara, Kyoto (JP); Motofumi Yoshino, Kyoto (JP); Teruyuki Yoshioka, Kyoto (JP); Shigenobu Arai, Kyoto (JP); Takuji Hotta, Kyoto (JP); Kazuichi Hirai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 318 days.

(21) Appl. No.: 09/769,518

(22) Filed: Jan. 26, 2001

(65) Prior Publication Data

US 2001/0024975 A1 Sep. 27, 2001

(30) Foreign Application Priority Data

Jan. 27, 2000 (JP) .......................................... 2000-018294

(51) Int. Cl.[7] .......................... A63F 13/00; A63F 9/24; G06F 17/00; G06F 19/00
(52) U.S. Cl. .............................. 463/43; 463/1; 273/434
(58) Field of Search ...................... 463/31, 1–9, 40–43; 237/434

(56) References Cited

U.S. PATENT DOCUMENTS 5,411,270 A * 5/1995 Naka et al. .................... 463/33
5,553,864 A * 9/1996 Sitrick ........................... 463/31
5,604,855 A * 2/1997 Crawford ...................... 345/473

* cited by examiner

Primary Examiner—Teresa Walberg
Assistant Examiner—Robert Mendoza
(74) Attorney, Agent, or Firm—Nixon & Vanderhye P.C.

(57) ABSTRACT

In a game processor GP that enable a player to play a plurality of games interrelated to each other, flash memory 12 stores a plurality of game programs PG interrelated to each other. SRAM 13 readably and writably stores backup data DG representing the progress of each of games A, B, and C. The player selects one of the game programs PG through a controller 70 to start game play. A deciding unit (CPU) 61 decides whether there is backup data DG for any game related to the game specific to the selected game. Based on a decision as to the backup data DG, a game program changer changes part of the game program PG.

29 Claims, 10 Drawing Sheets

FIG. 3

| GAME | SCENARIO UNIT | SELECTION CRITERIA |
|---|---|---|
| A | a1, a2 | UNCONDITIONAL |
| | a3 | FIRST PLAY |
| | a4 | ONLY GAME B CLEARED |
| | a5 | ONLY GAME C CLEARED |
| | a6 | GAMES B AND THEN C CLEARED |
| | a7 | GAMES C AND THEN B CLEARED |
| | a8 | UNCONDITIONAL |
| B | b1, b2 | UNCONDITIONAL |
| | b3 | FIRST PLAY |
| | b4 | ONLY GAME A CLEARED |
| | b5 | ONLY GAME C CLEARED |
| | b6 | GAMES A AND THEN C CLEARED |
| | b7 | GAMES C AND THEN A CLEARED |
| | b8 | UNCONDITIONAL |
| C | c1, c2 | UNCONDITIONAL |
| | c3 | FIRST PLAY |
| | c4 | ONLY GAME A CLEARED |
| | c5 | ONLY GAME B CLEARED |
| | c6 | GAMES A AND THEN B CLEARED |
| | c7 | GAMES B AND THEN A CLEARED |
| | c8 | UNCONDITIONAL |

F I G. 4

| GAME | GENERATION CRITERIA | SCENARIO | SCENARIO UNIT | FLAG |
|---|---|---|---|---|
| A | FIRST PLAY | SAα | a1, a2, a3, a8 | F1 |
| | ONLY GAME B CLEARED | SAβ | a1, a2, a4, a8 | F6 |
| | ONLY GAME C CLEARED | SAγ | a1, a2, a5, a8 | F8 |
| | GAMES B AND THEN C CLEARED | SAδ | a1, a2, a6, a8 | F14 |
| | GAMES C AND THEN B CLEARED | SAε | a1, a2, a7, a8 | F15 |
| B | FIRST PLAY | SBα | b1, b2, b3, b8 | F2 |
| | ONLY GAME A CLEARED | SBβ | b1, b2, b4, b8 | F4 |
| | ONLY GAME C CLEARED | SBγ | b1, b2, b5, b8 | F9 |
| | GAMES A AND THEN C CLEARED | SBδ | b1, b2, b6, b8 | F12 |
| | GAMES C AND THEN A CLEARED | SBε | b1, b2, b7, b8 | F13 |
| C | FIRST PLAY | SCα | c1, c2, c3, c8 | F3 |
| | ONLY GAME A CLEARED | SCβ | c1, c2, c4, c8 | F5 |
| | ONLY GAME B CLEARED | SCγ | c1, c2, c5, c8 | F7 |
| | GAMES A AND THEN B CLEARED | SCδ | c1, c2, c6, c8 | F10 |
| | GAMES B AND THEN A CLEARED | SCε | c1, c2, c7, c8 | F11 |

F I G. 5
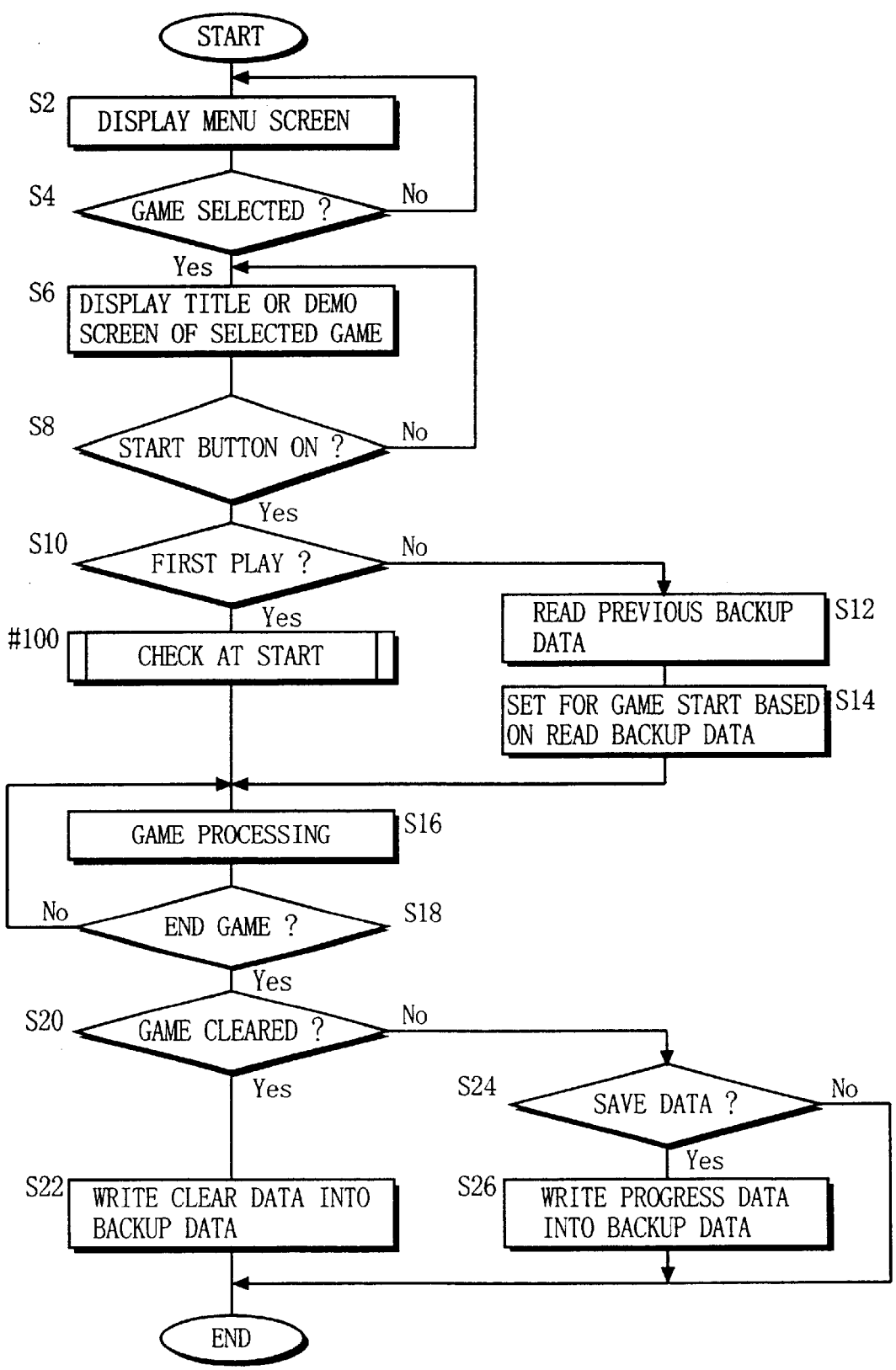

VIDEO GAME APPARATUS AND METHOD FOR UNIQUELY ENABLING PLAY OF MULTIPLE GAMES

FIELD OF THE INVENTION

The present invention relates to game processors that enable players to play various games with scenarios which vary according to the progress of each game, thereby achieving great versatility in possible game content. The present invention also relates to information storage media storing a game program therein to enable such versatility.

BACKGROUND AND SUMMARY OF THE INVENTION

Conventionally, game processors exist for executing game programs which exhibit a varied scenario. One example of such a game processor is disclosed in Japanese Patent No. 2930237 (hereinafter referred to as "background art"). In this background art, selecting any one of a set of hero characters provided in the game activates an event that has been uniquely set for the selected character. In this fashion, the game contents can be varied.

In this manner, the background art achieves versatility in game contents by activating an event unique to each game character. However, the game contents are always the same as long as the same character is selected. Therefore, the game appears to become more predictable as the game is played again and again. Thus, players tend to lose interest in the game and become bored with the game.

An advantage of the exemplary embodiments is that a game processor and information storage medium storing a game program are provided which varies each game in scenario according to the progress of other interrelated games.

A first aspect of the exemplary embodiments is directed to a game processor that enables a player to play a plurality of games interrelated to each other, the game processor comprising:

a game program storage for storing a plurality of game programs interrelated to each other;

a backup data storage for writably and readably storing backup data representing progress of each of the games separately played;

an operating unit for providing an instruction for selecting one of the plurality of game programs stored in the game program storage, and starting and playing a game specific to the selected game program;

a deciding unit for deciding, when the operating unit provides the instruction for starting the game, whether the backup data for another game related to the specific game is stored;

a game program changer for changing part of the selected game program, based on a decision made by the deciding unit as to the backup data;

a reader for reading the changed game program; and an image processing unit for carrying out image processing for the game program read by the reader and for making a display image changed based on the instruction provided by the operating unit.

As described above, in the first aspect, scenarios varied in content for one game can be generated according to the progress of other games related to the game now being played.

According to a second aspect, in the first aspect, the backup data storage includes a clear information storage area for storing clear information about any cleared game, and the deciding unit decides whether the clear information is written in the backup data for another game related to the specific game.

As described above, in the second aspect, players can have fun with playing the same game varied in scenario, according to the state of related games.

According to a third aspect, in the first aspect, each of the game programs stored in the game program storage is composed of a plurality of scenario units varied in type, and the game program changer selects, based on the decision made by the deciding unit, a predetermined scenario unit from the plurality of scenario units varied in type to compose the game program.

As described above, in the third aspect, one scenario is composed of a plurality of scenario units. Of the scenario units, a specific scenario unit is selected based on whether other related games have been cleared or not. Thus, the scenario varied in content can be easily composed.

According to a fourth aspect, in the first aspect, the game program storage is a readable and writable nonvolatile memory larger in capacity than each of the games;

the nonvolatile memory stores the game programs for at least two games that are interrelated to each other and played in a predetermined order; and the backup data storage has storage capacity capable of individually storing the backup data for each of the at least two games.

According to a fifth aspect, in the first aspect, the game program storage stores the plurality of game programs interrelated to each other for games that are same in game genre and hero character but different in scenario at least in part.

A sixth aspect is directed to a game information storage medium provided with an operating unit and a processing unit, the game information storage medium comprising:

a game program storage medium for storing a plurality of game programs interrelated to each other; and a backup data storage medium for writably and readably storing backup data representing progress of each of the games separately played, wherein the game program storage medium comprises;

a decision program for deciding whether backup data for another game related to a game specified by the operating unit is stored;

a change program for changing part of the game program for the specified game, based on a decision made by the decision program as to the backup data;

a read control program for reading the changed game program;

an image processing program for carrying out image processing for the game program read by the read control program and for making a display image changed based on an operation of the operating unit.

A seventh aspect is directed to a medium storing a game program for controlling a game processor that enables a player to play a plurality of games interrelated to each other, the game program when executed performing the steps of:

storing a plurality of game programs interrelated to each other;

writably and readably storing backup data as to progress of each of the games;

carrying out an operation by providing an instruction for selecting one of the plurality of game programs, and starting and playing a game specific to the selected game program;

deciding, when an instruction is provided for starting the specific game, whether the backup data for another game related to the specific game is stored;

changing part of the selected game program, based on a decision made in the deciding step as to the backup data;

reading the changed game program; and carrying out image processing for the read game program and for making a display image changed based on the operation.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a table showing scenario unit selection criteria based on a relation between related games in the game processor shown in FIG. 1;

FIG. 4 is a table showing a relation between scenarios composed based on the scenario unit selection criteria shown in FIG. 3 and scenario units;

FIG. 5 is a flow chart showing a scenario generation process in the game processor according to the present invention;

DESCRIPTION OF THE PREFERRED EMBODIMENTS

Figure 1:
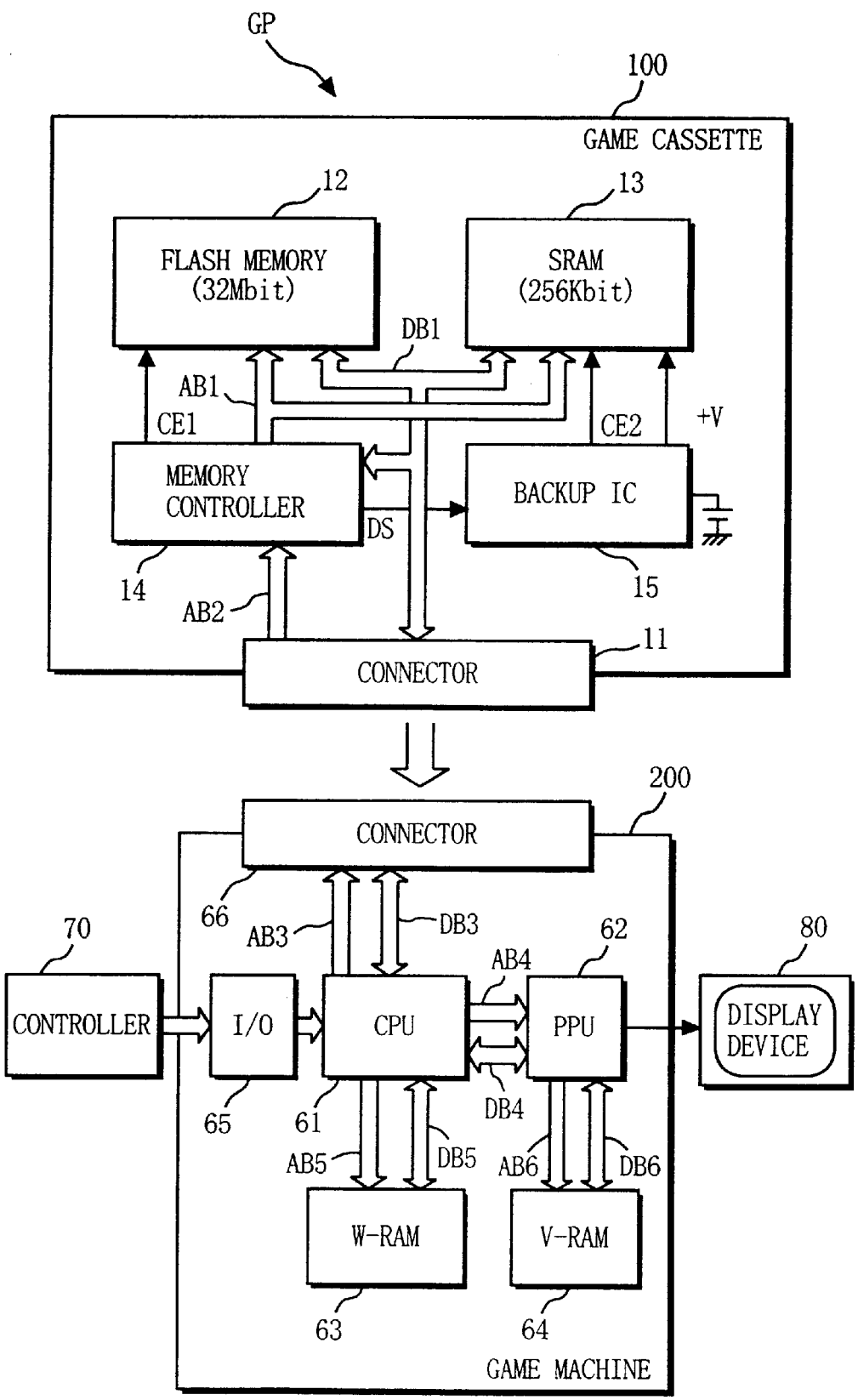
FIG. 1 is a block diagram showing the structure of a game processor according to the present invention.

With reference to FIG. 1, a game processor according to one embodiment to the present invention is described. A game processor GP according to the present embodiment includes a program source 100 and a game machine 200. The program source 100 stores information such as a program required for game execution in the game machine 200. The program source 100 is so structured as to be detachably connected to the game machine 200.

The program source 100 preferably includes a connector 11, flash memory 12, SRAM 13, a memory controller 14, and a backup IC 15. The program source 100 is generally packaged as a game cassette. In this sense, the program source is hereinafter also referred to as a game cassette 100. The flash memory 12 and the SRAM 13 are connected through a data bus DB1 to the connector 11, and also through an address bus AB1 to the memory controller 14. The memory controller 14 is connected through an address bus AB2 to connector 11.

As is well known, a flash memory is a rewritable non-volatile memory. In the present embodiment, the flash memory 12 has, for example, a 32M-bit storage capacity and is used for storing a game program, as described later. In the exemplary embodiment, the flash memory 12 is divided into eight 4M-bit blocks.

The SRAM 13 is static RAM for holding storage contents as long as it is supplied with electric power. In the present embodiment, the SRAM 13 has, for example, a 256K-bit storage capacity and is used for storing game backup data, such as data relating to cleared stages, captured items, and raised characters. In the exemplary embodiment, the SRAM 13 is divided into sixteen 16K-bit blocks.

The memory controller 14 in part operates to convert an address provided through the address bus AB2 by a cassette writer (not shown) or the game machine 200 into an address complying with memory mapping in the flash memory 12 and the SRAM 13. The backup IC 15 supplies the SRAM 13 with electric power coming from the cassette writer or the game machine 200 when the program source (game cassette) 100 is set therein.

The flash memory 12 and the SRAM 13 have a complementary relationship with each other, as being selected by a chip-select signal CE1 coming from the memory controller 14 and a chip-select signal CE2 coming from the backup IC 15, respectively. That is, when the flash memory 12 is selected, the SRAM 13 is not selected, and vice versa.

In this complementary relation, the flash memory 12 and the SRAM 13 are provided with data and addresses through the same data bus and address bus, but only the memory chip corresponding to the provided address is enabled to be accessed. The chip-select signal CE2 is generated by the backup IC 15 based on a 1-bit decode signal DS from the memory controller 14 and how much power is supplied to the SRAM 13.

Especially when the program source 100 set in the cassette writer or the game machine 200 is powered on to supply power, noise may be mixed in the address bus AB1 due to a transient response caused by power-on. If the noise happens to indicate any address in the SRAM 13, the memory controller 14 erroneously produces the decode signal DS and carries out unwanted writing in that address.

Therefore, the backup IC 15 monitors the voltage supplied by a power source in the cassette writer or the game machine 200. When powered on, the backup IC 15 does not provide the chip-select signal CE2 to the SRAM 13 until the voltage is stabilized at a predetermined value (approximately 4.5V). Thus, undesired, erroneous writing can be prevented at the time of power-on (power supply)

With respect to the address provided by the memory controller 14 through the address bus AB1 to the flash memory 12, the upper three bits are used to specify any one of eight blocks in the flash memory 12. Similarly, the upper four bits thereof are used to specify any one of sixteen blocks in the SRAM 13.

The game machine 200 includes, for example, a CPU 61, a PPU (picture (i.e., graphics) processing unit) 62, a working RAM 63, a video RAM 64, an I/O interface 65, and a connector 66. The CPU 61 is connected to the connector 66 through a data bus DB3 and an address bus AB3; to the PPU 62 through a data bus DB4 and an address bus AB4; and to the working RAM 63 through a data bus DB5 and an address bus AB5. The video RAM 64 is connected to the PPU 62 through a data bus DB6 and an address bus AB6. Outputs from the PPU 62 are provided to a display unit 80 such as a television receiver.

When a game is played, the connector 11 of the program source 100 is inserted into the connector 66 of the game machine 200. Thus, the flash memory 12 and the SRAM 13 are controlled by CPU 61. Then, CPU 61 reads a game program from the flash memory 12 to start a game operation. Also, the CPU 61 reads game backup data from the SRAM 13 as required to set parameters for the game operation. A controller 70 is operated by the player to provide various instructions and commands to the CPU 61.

The working RAM 63 stores various data required for arithmetic operations by the CPU 61. The PPU 62 generates, based on an instruction from the CPU 61, display data from character data stored in the video RAM 64. This display data is provided to the display unit 80 for display. As such, the PPU 62 relieves the CPU 61 of the requirement of generating display data, and enables the primary game operation quickly. The above-described game machine 200 and cassette 100 are set forth as one example of many possible game machines and storage media that may be used herein. For example, the game machine 200 and information storage media associated therewith may be implemented by the video game system described in application Ser. No. 09/465,754 and filed on Dec. 17, 1999, which application is hereby incorporated herein by reference.

Figure 2:
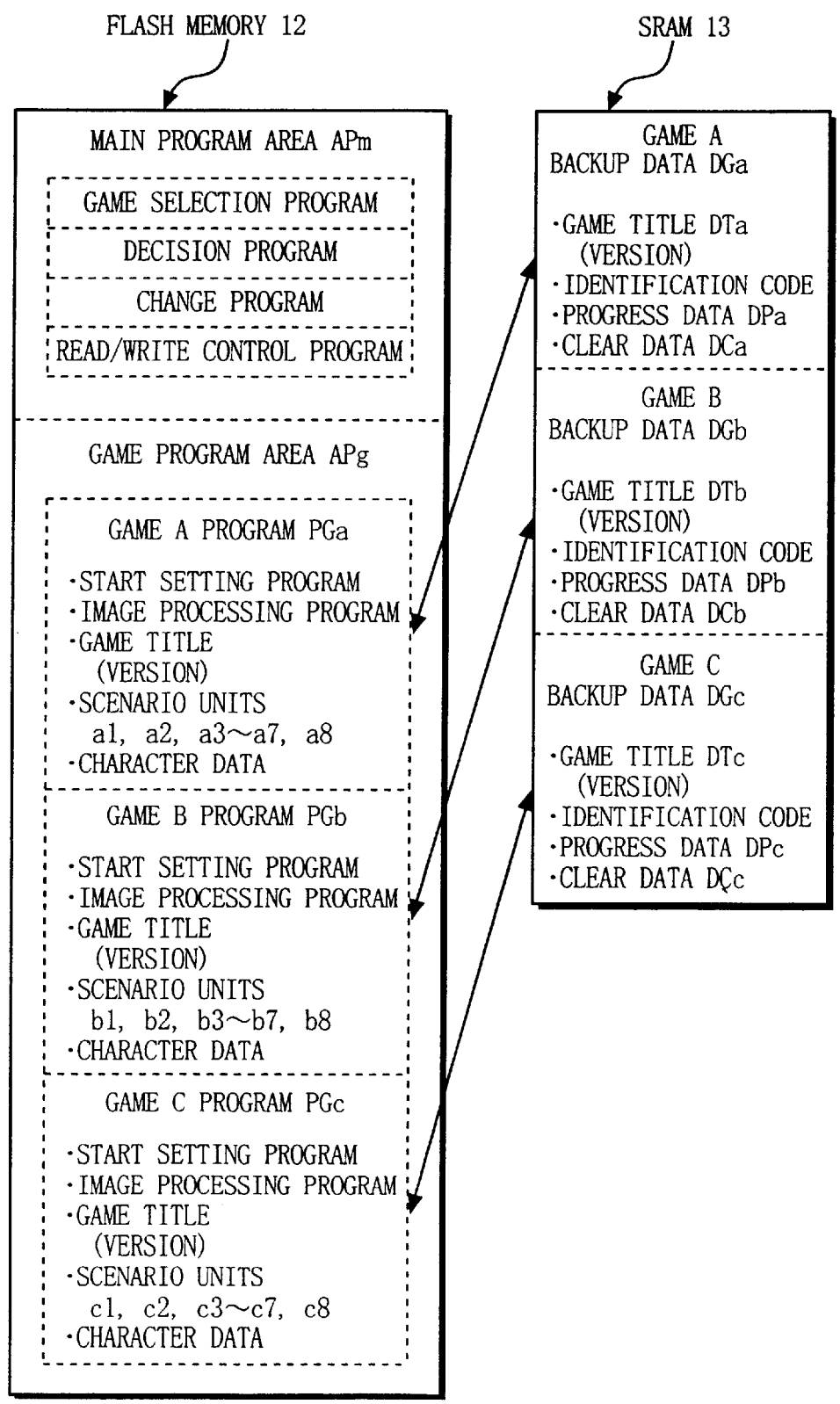
FIG. 2 is a schematic diagram showing the structure of storage areas of flash memory and SRAM shown in FIG. 1.

With reference to FIG. 2, exemplary data structures within storage areas of the flash memory 12 and the SRAM 13 are described in detail. The storage area of the flash memory 12 according to the present embodiment includes a main program area APm and a game program area APg. The main program area APm stores main programs AP such as a game selection program, a decision program, a change program, and a read/write control program.

The game program area APg stores a game A program PGa, a game B program PGb, and a game C program PGc, each used to execute a different game. In the present embodiment, three different game programs for a game A, a game B, and a game C are stored. Needless to say, however, any arbitrary number of game programs may be stored as long as the capacity of the flash memory 12 will permit such storage.

The game A program PGa includes program data required for executing the game A, such as a start setting program, an image processing program, a game title (version), scenario units a1, a2, a3 to a7, and a8 composing a scenario SA, and character data. Similarly, the game B program PGb includes program data required for executing the game B, such as a start setting program, an image processing program, a game title (version), scenario units b1, b2, b3 to b7, and b8 composing a scenario SB, and character data.

Also, the game C program PGc includes program data required for executing the game C, such as a start setting program, an image processing program, a game title (version), a scenario units c1, c2, c3 to c7, and c8 composing a scenario SC, and character data.

In the present embodiment, these games A, B, and C are, for example, related to one another as being the same in genre and hero character but different in part with respect to each scenario.

The SRAM 13 stores backup data for the game programs PGa, PGb, and PGc written in the game program area APg of the flash memory 12.

For example, game A backup data DGa includes a game title (version) DTa, an identification code of the player, progress data DPa indicating the progress of the game A, clear data DCa, and others all for the game A program PGa. Similarly, game B backup data DGb and game B backup data DGc include backup data for the game B program PGb and the game C program PGc, respectively, as shown in FIG. 2.

While game A is being executed, the game title DTa is automatically recorded in the game A backup data DGa of the SRAM 13. Similarly, the clear data DCa is automatically recorded, once the player clears the game A. In the clear data DCa, the order of clearing is recorded based on the presence or absence of the clear data DCb and DCc for the related games B and C.

In the exemplary embodiment, the progress data DPa is not recorded until the player willingly stores the game state when suspending or ending the game. When the progress data DPa is recorded, the game title DTa may be recorded at the same time. In the present embodiment, the main programs AP and the game programs PG are stored in the flash memory 12 while the backup data DG is stored in the SRAM 13. Alternatively, all of these programs may be stored in a single memory.

With reference to a table showing exemplary scenario unit selection criteria in FIG. 3, the generation of scenarios differing in content based on the situation when the player starts the game will be described. First, the game A is composed by selectively combining a plurality of scenario units.

In the present embodiment, the scenario SA of the game A is composed by selectively combining any of the scenario units a1, a2, a3, a4, a5, a6, a7, and a8. Alternatively, the scenario SA may be composed of an adequate number of scenario units within the limitations of the capacity of the flash memory 12.

As shown in FIG. 3, the scenario units a1 and a2 are unconditionally selected to compose the scenario SA when the game A is played.

The scenario unit a3 is selected only when the game A is played for the first time.

The scenario unit a4 is selected when the game A is played with only the game B already cleared.

The scenario unit a5 is selected when the game A is played with only the game C already cleared.

The scenario unit a6 is selected when the game A is played with the game B and then the game C already cleared.

The scenario unit a7 is selected when the game A is played with the game C and then the game B already cleared.

The scenario unit a8 is unconditionally selected when the game A is played.

With reference to FIG. 4, the generation of the game scenario SA having different stories by selectively combining the scenario units based on the criteria will be described. As shown in FIG. 4, when the game A is played for the first time, a scenario SAα composed of the scenario units a1, a2, a3 and a8 is generated, based on the criteria described with reference to FIG. 3.

When the game A is played with only the game B already cleared, a scenario SAβ composed of the scenario units a1, a2, a4, and a8 is generated.

When the game A is played with only the game C already cleared, a scenario SAγ composed of the scenario units a1, a2, a5, and a8 is generated.

When the game A is played with the game B and then the game C already cleared, a scenario SAδ composed of the scenario units a1, a2, a6, and a8 is generated.

When the game A is played with the game C and then the game B already cleared, a scenario SAε composed of the scenario units a1, a2, a7, and a8 is generated.

As such, in the present embodiment, five scenarios SAα, SAβ, SAγ, SAδ, and SAε each composed of four scenario units and differing in story from one anther can be generated in the game A. In any of these five scenarios SAα, SAβ, SAγ, SAδ, and SAε, the first, second, and last scenario units are always a1, a2, and a8, respectively.

In other words, based on the criteria shown in FIG. 3, the third scenario unit is selected from among the five scenario units a3, a4, a5, a6, and a7 according to the situation at the time of starting the game. As such, in the present embodiment, the first, second, and fourth scenario units are fixed. Alternatively, every scenario unit may be selected from all scenario units a1 to a8, or the third may be fixed. Furthermore, needless to say, the game scenario SA may be composed by combining an arbitrary number of scenario units, and every scenario unit may be selected fixedly or based on the criteria.

As clearly shown in FIGS. 3 and 4, also for the games B and C, various scenarios SB and SC are generated by selecting scenario units according to the situation at the time of starting the game.

More specifically, for the game B, the scenario units b1 and b2 are unconditionally selected when the game B is played.

The scenario unit b3 is selected only when the game B is played for the first time.

The scenario unit b4 is selected when the game B is played with only the game A already cleared.

The scenario unit b5 is selected when the game B is played with only the game C already cleared.

The scenario unit b6 is selected when the game B is played with the game A and then the game C already cleared.

The scenario unit b7 is selected when the game B is played with the game C and then the game A already cleared.

The scenario unit b8 is unconditionally selected when the game B is played.

Therefore, when the game B is played for the first time, a scenario $SB\alpha$ composed of the scenario units b1, b2, b3 and b8 is generated.

When the game B is played with only the game A already cleared, a scenario $SB\beta$ composed of the scenario units b1, b2, b4, and b8 is generated.

When the game B is played with only the game C already cleared, a scenario $SB\gamma$ composed of the scenario units b1, b2, b5, and b8 is generated.

When the game B is played with the game A and then the game C already cleared, a scenario $SB\delta$ composed of the scenario units b1, b2, b6, and b8 is generated.

When the game B is played with the game C and then the game A already cleared, a scenario $SB\epsilon$ composed of the scenario units b1, b2, b7, and b8 is generated.

For the game C, the scenario units c1 and c2 are unconditionally selected when the game C is played.

The scenario unit c3 is selected only when the game C is played for the first time.

The scenario unit c4 is selected when the game C is played with only the game A already cleared.

The scenario unit c5 is selected when the game C is played with only the game B already cleared.

The scenario unit c6 is selected when the game C is played with the game A and then the game B already cleared.

The scenario unit c7 is selected when the game C is played with the game B and then the game A already cleared.

The scenario unit c8 is unconditionally selected when the game C is played.

As a result, when the game C is first played, a scenario $SC\alpha$ composed of the scenario units c1, c2, c3 and c8 is generated.

When the game C is played with only the game A already cleared, a scenario $SC\beta$ composed of the scenario units c1, c2, c4, and c8 is generated.

When the game C is played with only the game A already cleared, a scenario $SC\gamma$ composed of the scenario units c1, c2, c5, and c8 is generated.

When the game C is played with the game A and then the game B already cleared, a scenario $SC\delta$ composed of the scenario units c1, c2, c6, and c8 is generated.

When the game C is played with the game B and then the game A already cleared, a scenario $SC\epsilon$ composed on the scenario units c1, c2, c7, and c8 is generated.

Also in scenario generation for the games B and C, the first, second and last scenario units are fixed in the present embodiment. Alternatively, every scenario unit may be selected from all scenario units based on the criteria, or the third may be fixed. Furthermore, needless to say, the game scenarios SB and SC may be composed by combining an arbitrary number of scenario units, and every scenario unit may be selected fixedly or based on the criteria.

In FIG. 4, the fourth column is provided for flags. In this flag column, flags F1 to F15 (not in particular order) are shown. These flags F1 to F15 correspond to "generation criteria" also shown in FIG. 4, and will be described later in detail with reference to FIGS. 6, 7, 8, 9, and 10.

Next, with reference to a flowchart shown in FIG. 5, a scenario generation operation by the game processor GP according to an exemplary embodiment of the present invention is now described. When the power source of the game processor GP is powered on to start the operation, in step S2, a menu screen for the games A, B, and C is displayed on the display unit 80. Then, the procedure goes to a next step S4.

In step S4, based on the operation of the controller 70 by the player, it is decided whether any of the games A, B, and C displayed on the menu screen has been selected. If the player has not selected any game, No is decided, and the procedure returns to step S2. On the other hand, if any of the games A, B, and C has been selected, Yes is decided, and the procedure goes to a next step S6.

In step S6, the title or demo screen of the game selected in step S4 is displayed on the display unit 80. Then, the procedure goes to step S8.

In step S8, it is decided that the player has pressed a start button provided on the controller 70 to start the game selected in step S4. If No, the procedure returns to step S6, wherein displaying the title or demo screen continues until an input for game start is received from the player. On the other hand, if Yes, the procedure goes to a next step S10.

In step S10, it is decided whether the game selected in step S4 and started in step S8 has never been played before and is going to be played for the first time. This decision is made based on the game backup data DG recorded in the SRAM 13.

That is, any of the clear data DC, the progress data DP, the game title DT for the selected game is recorded in the game backup data DG, it is decided whether the game has been previously played.

If Yes in step S10, the procedure goes to step S16 through a check-at-start subroutine process in step #100. The check-at-start subroutine process in step #100 will be described below in detail with reference to FIGS. 6, 7, and 8.

On the other hand, if No in step S10, that is, if the game to be started has been previously played, the procedure goes to step S12.

In step S12, the backup data for the selected game is read from the SRAM 13. That is, the backup data to be read is any one of the game A backup data DGa, the game B backup data DGb, and the game C backup data DGc. Then, the procedure goes to a next step S14.

In step S14, a setting process required at the time of starting the game is carried out based on the read backup data, that is, any one of the game A backup data DGa, the game B backup data DGb, and the game C backup data DGc. Then, the procedure goes to step S16.

After the setting process for the selected game in step #100 or step S14, the game program PG of the selected game is executed in step S16. The game is executed for a predetermined amount, and then the procedure goes to a next step S18.

In step S18, it is decided, based on the operation of the controller 70, whether the player initiated an instruction for ending the game. If No, the procedure returns to step S16 to continue executing the game for the predetermined amount. On the other hand, if Yes, the procedure goes to a next step S20.

In step S20, it is decided, based on the operation of the controller 70 and the state of execution of the game program, whether the player has cleared the game. If Yes, the procedure goes to step S22.

In step S22, clear data is written in the clear data area DC of the backup data DG in the SRAM 13. Then, the procedure ends.

On the other hand, if No in step S20, that is, if the player has not yet cleared the game, the procedure goes to step S24.

In step S24, it is decided, based on the operation of the controller 70 and the state of the game program, whether the player initiated an instruction for storing the state of the play (progress) of the game before ending (suspending) the game. If Yes, the procedure goes to step S26.

In step S26, the progress data is written in the progress data area DP of the backup data DG in the SRAM 13. Then, the procedure ends.

If No in step S24, that is, if the player did not clear the game nor make an instruction for storing the progress of the game, the procedure ends.

Figure 6:
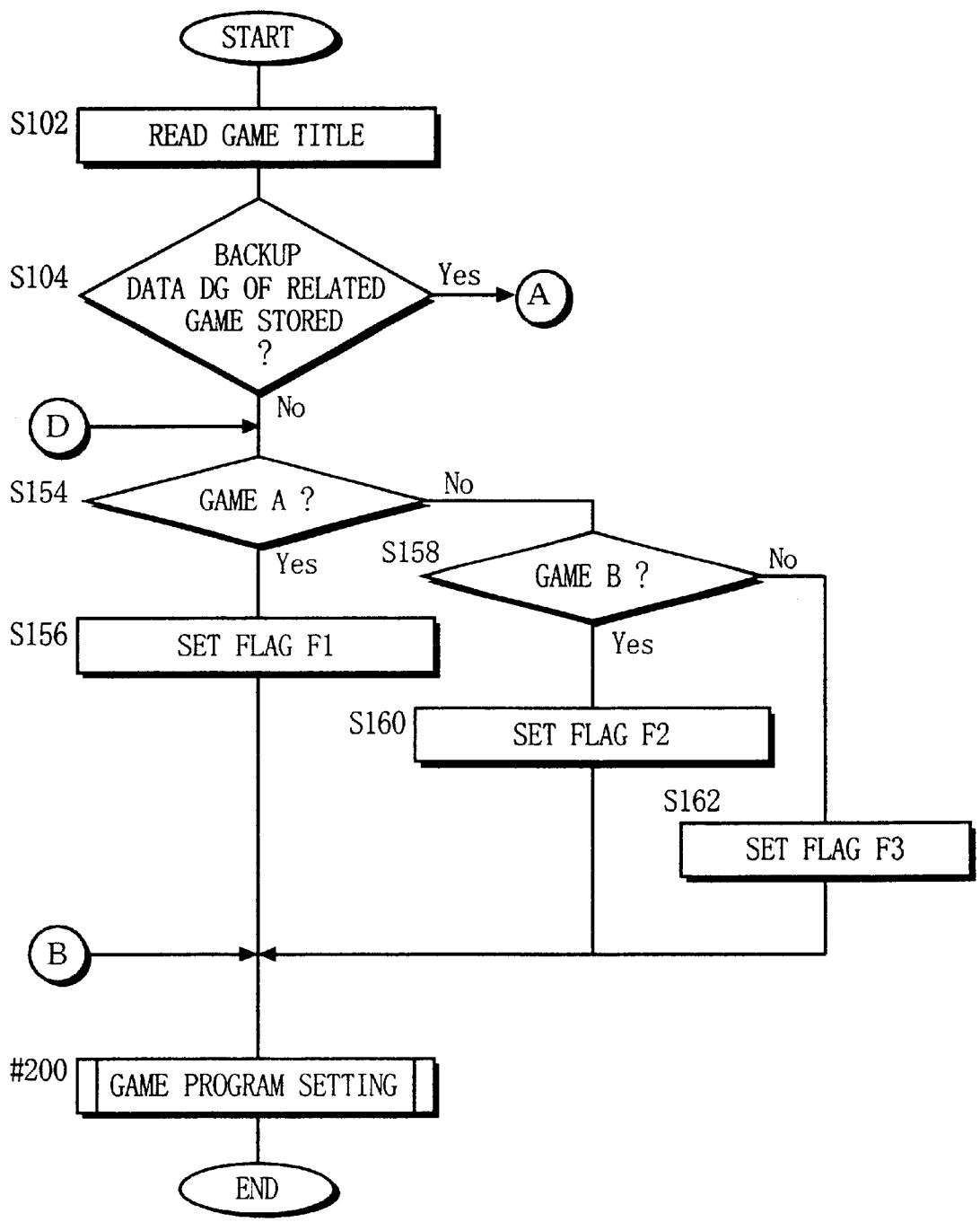
FIGS. 6, 7, and 8 are flowcharts showing a process in step #100 shown in FIG. 5.

With reference to FIG. 6, the check-at-start subroutine in step #100 will be described.

In the above-described step S10, if it is decided that the selected game is played for the first time, in step S102, the title of the selected game is read from the game program area APg of the flash memory 12. Then, the procedure goes to step S104.

In step S104, as already described with reference to FIGS. 3 and 4, it is decided whether the backup data DG of any other games that affect selection of scenario units used for generating the scenario for the selected game is stored in the SRAM 13.

In the present embodiment, the backup data DG, especially the clear data DC, is used for deciding which scenario units are selected. If Yes in step S104, the procedure goes to steps S106 to S128 shown in FIG. 7, steps S130 to S152 shown in FIG. 8, and then step S154 shown in FIG. 6 or step #200 of a game program setting subroutine.

Figure 7:
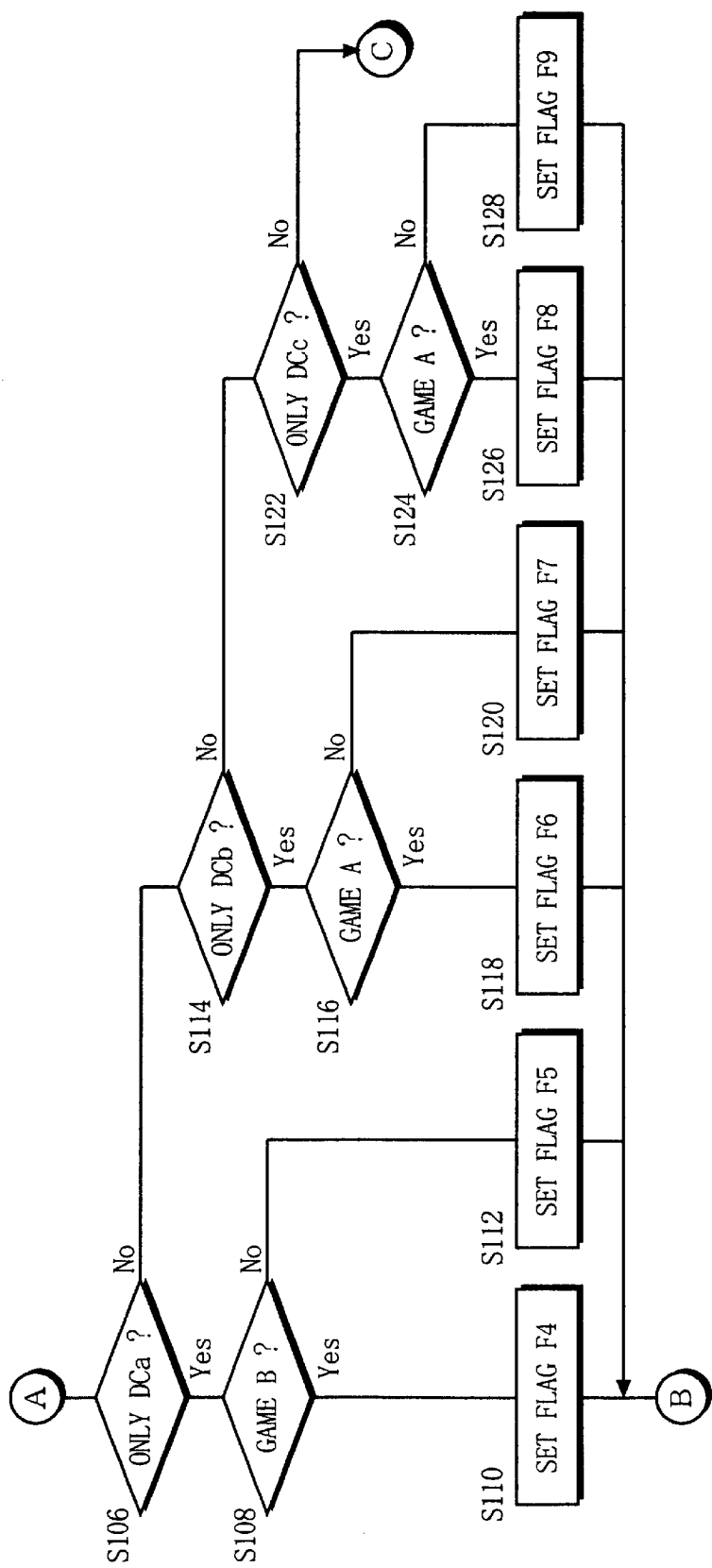

If Yes in step S104, it is decided in step S106 shown in FIG. 7 whether the clear data DC stored in the SRAM 13 is only the clear data DCa for the game A. If Yes, that is, if only the game A has been cleared, the procedure goes to a next step S108.

In step S108, it is decided whether the title of the game read in step S102 is that of the game B. If Yes, that is, if the selected game is the game B, the procedure goes to a next step S110.

In step S110, the flag F4 is set. Then, the procedure goes to step #200 shown in FIG. 6. That is, the flag F4 indicates that only the game A has been cleared at the time of starting the game B.

On the other hand, if No, that is, if the only the game A has been cleared and the selected game is the game C, the procedure goes to step S112.

In step S112, the flag F5 is set. Then, the procedure goes to step #200 shown in FIG. 6. That is, the flag F5 indicates that only the game A has been cleared at the time of starting the game C.

If No in the above step S106, that is, if not only the game A but also other game have been cleared, the procedure goes to step S114.

In step S114, it is decided whether the clear data DC stored in the SRAM 13 is only the clear data DCb for the game B. If Yes, that is, if only the game B has been cleared, the procedure goes to a next step S116.

In step S116, it is decided whether the title of the game read in the above step S102 is that of the game A. If Yes, that is, if the selected game is the game A, the procedure goes to a next step S118.

In step S118, the flag F6 is set. Then, the procedure goes to step #200 shown in FIG. 6. The flag F6 indicates that only the game B has been cleared at the time of starting the game A.

On the other hand, if No in step S116, that is, if only the game B has been cleared and the selected game is the game C, the procedure goes to step S120.

In step S120, the flag F7 is set. Then, the procedure goes to step #200 shown in FIG. 6. The flag F7 indicates that only the game B has been cleared at the time of starting the game C.

If No in the above step S114, that is, if not only the game B but also other games have been cleared, the procedure goes to step S122.

In step S122, it is decided whether the clear data DC stored in the SRAM 13 is only the clear data DCc for the game C. If Yes, that is, if only the game C has been cleared, the procedure goes to a next step S124.

In step S124, it is decided whether the title of the game read in the above step S102 is that of the game A. If Yes, that is, if the selected game is the game A, the procedure goes to a next step S126.

In step S126, the flag F8 is set. Then, the procedure goes to step #200 shown in FIG. 6. That is, the flag F8 indicates that only the game C has been cleared at the time of starting the game A.

On the other hand, if No in step S124, that is, if only the game C has been cleared and the selected game is the game B, the procedure goes to step S128.

In step S128, the flag F9 is set. Then, the procedure goes to step #200 shown in FIG. 6. That is, the flag F9 indicates that only the game C has been cleared at the time of starting the game B.

Figure 8:
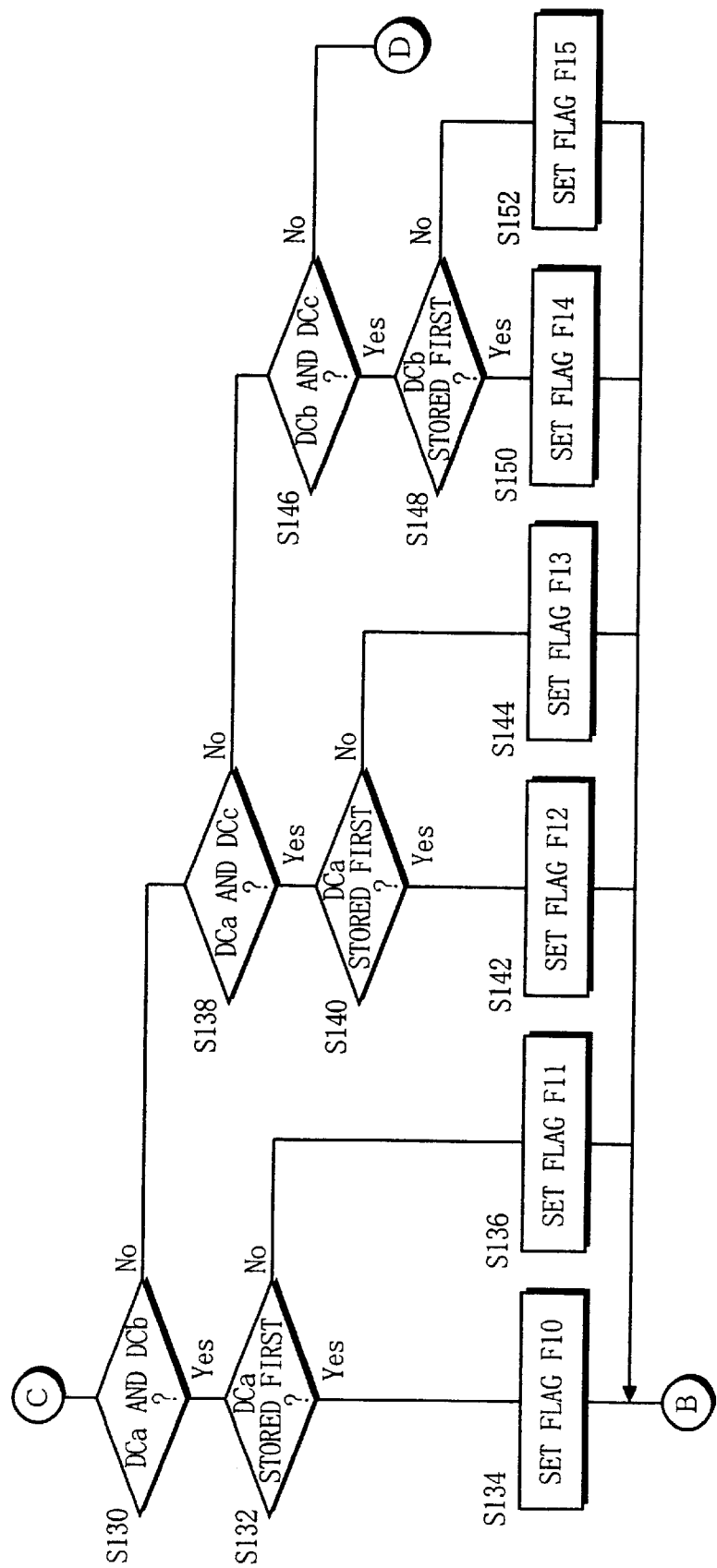

If No in the above step S122, that is, if not only the game C but also other game have been cleared, the procedure goes to step S130 shown in FIG. 8.

In step S130, it is decided whether the clear data Dca and the clear data DCb are stored in the SRAM 13. If Yes, that is, if the games A and B have been cleared, the procedure goes to a next step S132.

In step S132, it is decided whether the clear data DCa was stored preceding the clear data DCb. If Yes, that is, if the game A has been cleared before the game B, the procedure goes to a next step S134.

In step S134, the flag F10 is set. Then, the procedure goes to step #200. That is, the flag F10 indicates that the game A and then the game B have been cleared at the time of starting the game C.

On the other hand, if No in step S132, that is, if the game B has been cleared before the game A, the procedure goes to step S136.

In step S136, the flag F11 is set. Then, the procedure goes to step #200. That is, the flag F11 indicates that the game B and then the game A have been cleared at the time of starting the game C.

If No in the above step S130, that is, if not both of the games A and B have been cleared, the procedure goes to step S138.

In step S138, it is decided whether the clear data DCa and DCc are stored in the SRAM 13. If Yes, that is, if the games A and C have already been cleared, the procedure goes to a next step S140.

In step S140, it is decided whether the clear data DCa was stored preceding the clear data DCc. If Yes, that is, if the game A has been cleared before the game C, the procedure goes to a next step S142.

In step S142, the flag F12 is set. Then, the procedure goes to step #200. That is, the flag F12 indicates that the game A and then the game C have been cleared at the time of starting the game B.

On the other hand, if No in step S140, that is, if the game C has been cleared before the game A, the procedure goes to step S144.

In step S144, the flag F13 is set. Then, the procedure goes to step #200. That is, the flag F13 indicates that the game C and then the game A have been cleared at the time of starting the game B.

If No in the above step S138, that is, if not both of the games A and C have been cleared, the procedure goes to step S146.

In step S146, it is decided whether the clear data DCb and DCc are stored in the SRAM 13. If Yes, that is, if the games B and C have been already cleared, the procedure goes to a next step S148.

In step S148, it is decided whether the clear data DCb was stored preceding the clear data DCc. If Yes, that is, if the game B has been cleared before the game C, the procedure goes to step S150.

In step S150, the flag F14 is set. Then, the procedure goes to step #200. That is, the flag F14 indicates that the game B and then the game C have been cleared at the time of starting the game A.

On the other hand, if No in step S148, that is, if the game C has been cleared before the game B, the procedure goes to step S152.

In step S152, the flag F15 is set. Then, the procedure goes to step #200. That is, the flag F15 indicates that the game C and then the game B have been cleared at the time of starting the game A.

If No in step S146, that is, if not both of the games B and C have been cleared, the procedure goes to step S154 shown in FIG. 6.

As such, the flags F4 to F15 are set as corresponding to the scenario unit selection criteria.

If it is decided in step S104 shown in FIG. 6 that the backup data DG is stored, the procedure goes through the process shown in FIGS. 7 and 8. Then, if no game has been cleared, none of the flags is set in the process shown in FIGS. 7 and 8, and the procedure goes to step S154 shown in FIG. 6.

Further, if it is decided in step S104 that the backup data DG is not stored, any flag corresponding to the scenario unit selection criteria is not set, and then the procedure goes to step S154. In other words, any one of the flags F4 to F15 is not set at the time of starting the process in step S154.

In step S154, it is decided whether the title of the game read in the above step S102 is that of the game A. If Yes, that is, if the selected game is the game A, the flag F1 is set. Then, the procedure goes to the game program setting subroutine in step #200. That is, the flag F1 indicates that the game A is played for the first time.

On the other hand, if No in step S154, that is, if the selected game is not the game A, the procedure goes to step S158.

In step S158, it is decided whether the title of the game read in step S102 is that of the game B. If Yes, that is, if the selected game is the game B, the flag F2 is set. Then, the procedure goes to step #200. That is, the flag F2 indicates that the game B is played for the first time.

On the other hand, if No in step S158, that is, if the selected game is not the game B, the procedure goes to step S162.

In step S162, the selected game is the game C, and the flag F3 is set. Then, the procedure goes to step #200. That is, the flag F3 indicates that the game C is played for the first time.

Figure 9:
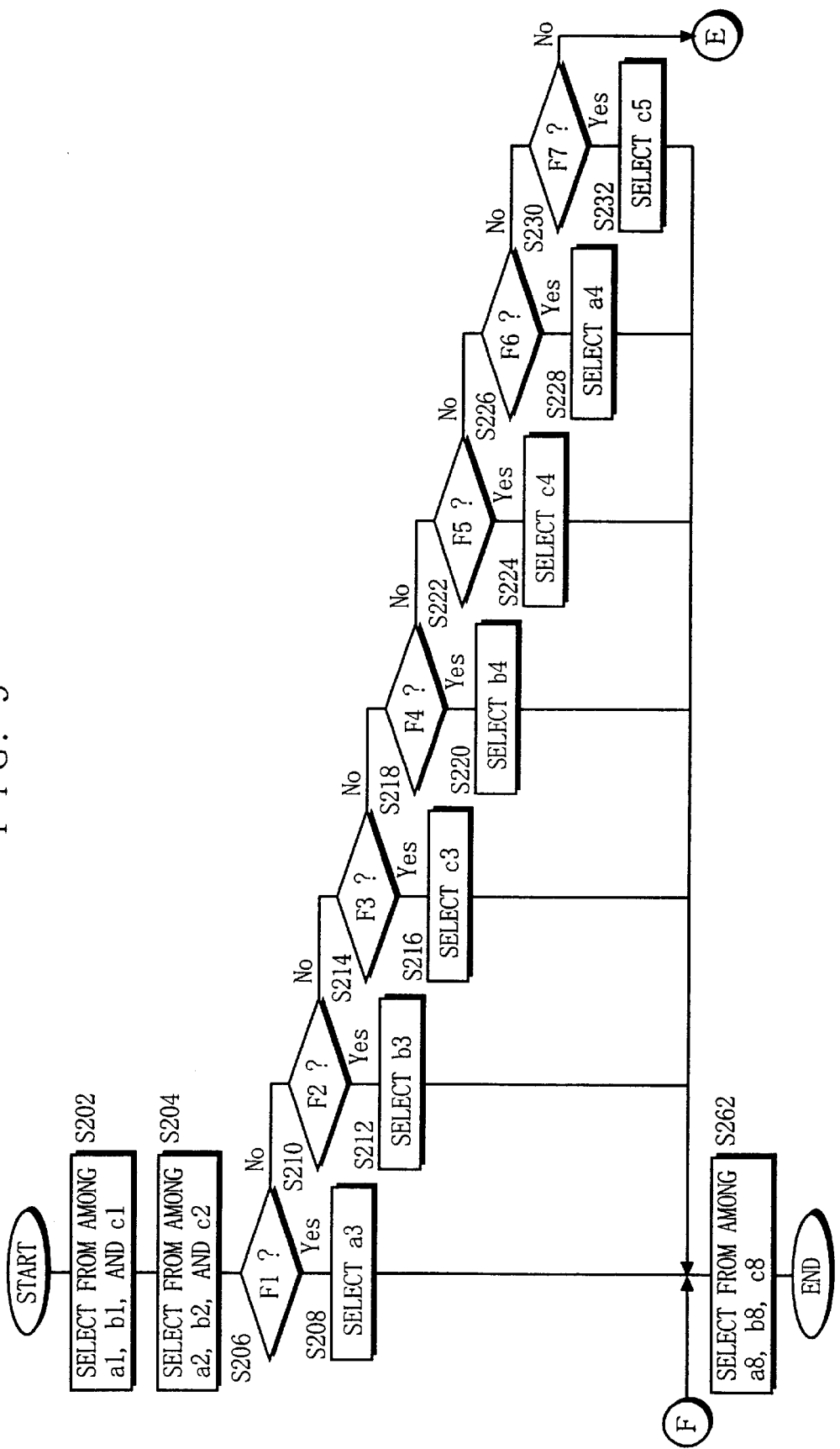
FIGS. 9, and 10 are flowcharts showing a process in step #200 shown in FIG. 6.

Next, with reference to FIGS. 9 and 10, the game program setting subroutine in step #200 will be described in detail. The process in step #200 starts with the scenario unit selection criteria detected through the above-described procedure as any of the flags F1 to F15. The relationship between scenario unit selection criteria and the flags F1 to F15 is shown in FIG. 4.

First, in step S202, among the first scenario units a1, b1, and c1 composing the scenarios SA, SB, and SC, respectively, the one that corresponds to the game decided in the above step S4 is selected. Then, the procedure goes to a next step S204.

In step S204, among the second scenario units a2, b2, and c2 composing the scenarios SA, SB, and SC, respectively, the one that corresponds to the first scenario unit selected in step S202 is selected. Then, the procedure goes to a next step S206.

In step S206, it is decided whether the flag F1 has been set. If the flag F1 has been set, that is, if the game A is played for the first time, the procedure goes to step S208.

In step S208, the scenario unit a3 is selected as the third scenario unit composing the scenario SAα. Then, the procedure goes to step S262. On the other hand, if No in step S206, the procedure goes to step S210.

In step S210, it is decided whether the flag F2 has been set. If the flag F2 has been set, that is, if the game B is played for the first time, the procedure goes to step S212.

In step S212, the scenario unit b3 is selected as the third scenario unit composing the scenario SBα. Then, the procedure goes to step S262. On the other hand, if No in step S210, the procedure goes to step S214.

In step S214, it is decided whether the flag F3 has been set. If the flag F3 has been set, that is, if the game C is played for the first time, the procedure goes to step S216.

In step S216, the scenario unit c3 is selected as the third scenario unit composing the scenario SCα. Then, the procedure goes to step S262. On the other hand, if No in step S214, the procedure goes to step S218.

In step S218, it is decided whether the flag F4 has been set. If the flag F4 has been set, that is, if only the game A has been cleared at the time of starting the game B, the procedure goes to step S220.

In step S220, the scenario unit b4 is selected as the third scenario unit composing the scenario SBβ. Then, the procedure goes to step S262. On the other hand, if No in step S218, the procedure goes to step S222.

In step S222, it is decided whether the flag F5 has been set. If the flag F5 has been set, that is, if only the game A has been cleared at the time of starting the game C, the procedure goes to step S224.

In step S224, the scenario unit c4 is selected as the third scenario unit composing the scenario SCβ. Then, the procedure goes to step S262. On the other hand, if No in step S222, the procedure goes to step S226.

In step S226, it is decided whether the flag F6 has been set. If the flag F6 has been set, that is, if only the game B has been cleared at the time of starting the game A, the procedure goes to step S228.

In step S228, the scenario unit a4 is selected as the third scenario unit composing the scenario SAβ. Then, the procedure goes to step S262. On the other hand, if No in step S226, the procedure goes to step S230.

In step S230, it is decided whether the flag F7 has been set. If the flag F7 has been set, that is, if only the game B has been cleared at the time of starting the game C, the procedure goes to step S232.

In step S232, the scenario unit c5 is selected as the third scenario unit composing the scenario SCγ. Then, the procedure goes to step S262.

Figure 10:
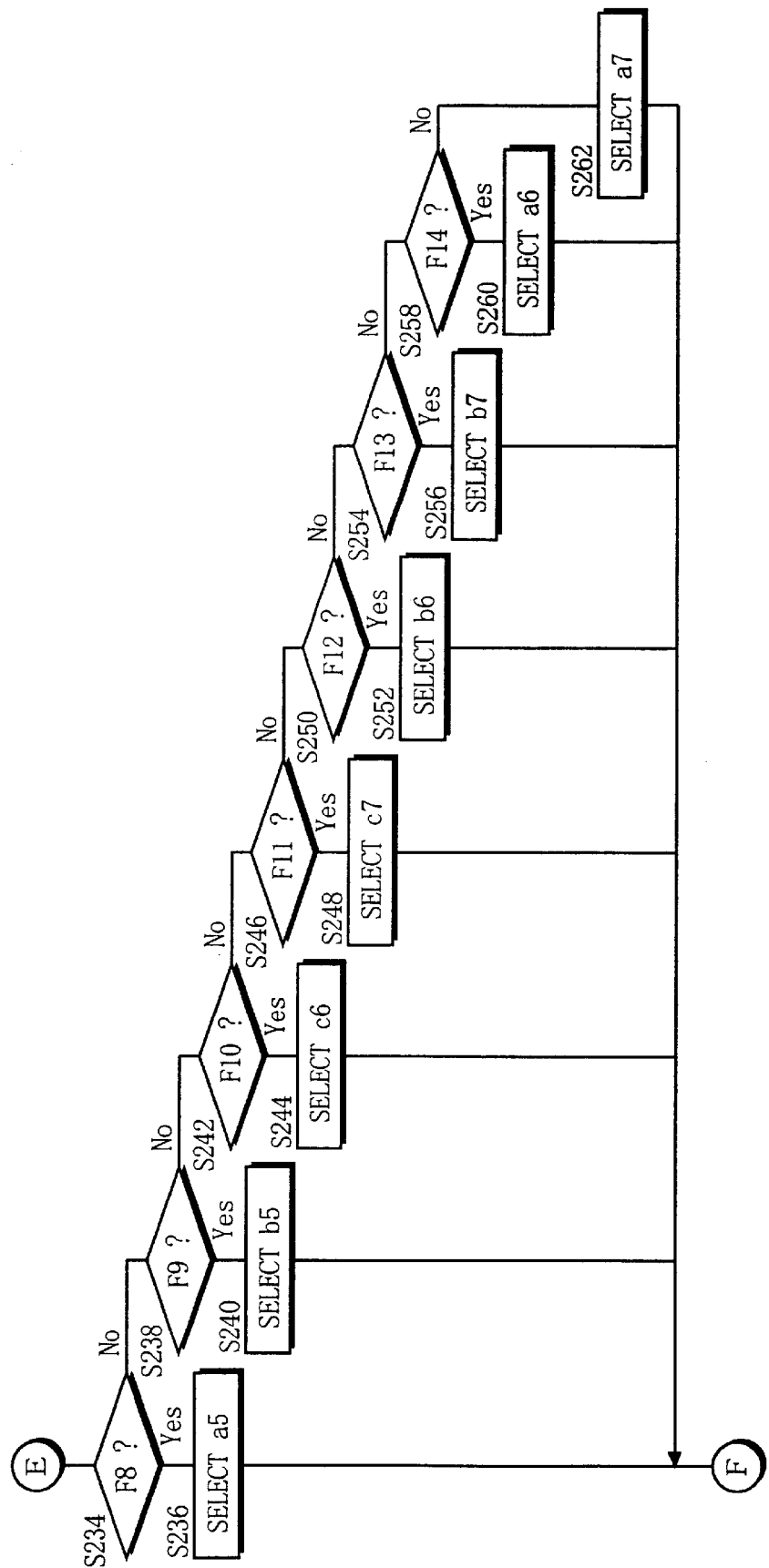

On the other hand, if No in step S230, the procedure goes to step S234 shown in FIG. 10.

In step S234, it is decided whether the flag F8 has been set. If the flag F8 has been set, that is, if only the game C has been cleared at the time of starting the game A, the procedure goes to step S236.

In step S236, the scenario unit a5 is selected as the third scenario unit composing the scenario SAγ. Then, the procedure goes to step S262. On the other hand, if No in step S234, the procedure goes to step S238.

In step S238, it is decided whether the flag F9 has been set. If the flag F9 has been set, that is, if only the game C has been cleared at the time of starting the game B, the procedure goes to step S240.

In step S240, the scenario unit b5 is selected as the third scenario unit composing the scenario SBγ. Then, the procedure goes to step S262. On the other hand, if No in step S238, the procedure goes to step S242.

In step S242, it is decided whether the flag F10 has been set. If the flag F10 has been set, that is, if the game A and then the game B have been cleared at the time of starting the game C, the procedure goes to step S244.

In step S244, the scenario unit c6 is selected as the third scenario unit composing the scenario SCδ. Then, the procedure goes to step S262. On the other hand, if No in step S242, the procedure goes to step S246.

In step S246, it is decided whether the flag F11. Has been set. If the flag F11 has been set, that is, if the game B and then the game A have been cleared at the time of starting the game C, the procedure goes to step S248.

In step S248, the scenario unit c7 is selected as the third scenario unit composing the scenario SCε. Then, the procedure goes to step S262. On the other hand, if No in step S246, the procedure goes to step S250.

In step S250, it is decided whether the flag F12 has been set. If the flag F12 has been set, that is, if the game A and then the game C have been cleared at the time of starting the game B, the procedure goes to step S252.

In step S252, the scenario unit b6 is selected as the third scenario unit composing the scenario SBδ. Then, the procedure goes to step S262. On the other hand, if No in step S250, the procedure goes to step S254.

In step S254, it is decided whether the flag F13 has been set. If the flag F13 has been set, that is, if the game C and then the game A have been cleared at the time of starting the game B, the procedure goes to step S256.

In step S256, the scenario unit b7 is selected as the third scenario unit composing the scenario SBε. Then, the procedure goes to step S262.

On the other hand, if No in step S254, the procedure goes to step S258.

In step S258, it is decided whether the flag F14 has been set. If the flag F14 has been set, that is, if the game B and then the game C have been cleared at the time of starting the game A, the procedure goes to step S260.

In step S260, the scenario unit a6 is selected as the third scenario unit composing the scenario SAδ. Then, the procedure goes to step S262.

On the other hand, if No in step S258, the flag F15 has been set. That is, the game C and then the game B have been cleared at the time of starting the game A. Therefore, the scenario unit a7 is selected as the third scenario unit composing the scenario SAε. Then, the procedure goes to step S262.

In step S262, among the fourth scenario units a8, b8, and c8 composing the scenarios SA, SB, and SC, respectively, the one that corresponds to the game decided in the above step 34 as selected is selected.

As described above, in the check-at-start subroutine in step #100 described with reference to FIGS. 6, 7, and 8, the interrelation between the games A, B, and C is detected. Then, the detected interrelation is represented as any one of the flags F1 to F15. Based on which flag has been set, the combination of scenario units composing each of the game scenarios SA, SB, and SC is varied. Therefore, for example, five scenarios SAα, SAβ, SAγ, SAδ, and SAε can be generated for the game A, thereby achieving versatility in game content. As evident from the above, the same goes for the games B and C.

Also in the embodiment of the present invention, each of the progressions of the games A, B, and C and the interrelation therebetween are typically applied as the scenario unit selection criteria, as shown in FIGS. 3 and 4. Alternatively, as such scenario unit selection criteria, a time taken for clearing each scenario unit composing a single scenario may be applied for selecting the following scenario unit.

Furthermore, the number of strokes of a specific or arbitrary key operated by the player by the time he/she clears a single scenario unit or during a predetermined time may be applied for the purpose of selecting the following scenario unit.

Also, information about time kept by an internal clock incorporated in the game processor GP may be applied for the same purpose. As such, by applying the amount varied irrespectively of the player's operation as the criteria for scenario unit selection, versatility in a single game can be achieved. If an amount that is difficult to be recognized by the player is used, the game content will become more unpredictable.

In the above-described embodiment, the game program and backup data are stored in a single game cassette. Alternatively, the backup data may be separately stored in a memory card such as a RAM card, or in a storage unit such as RAM or a hard disk internally provided in the game machine.

Moreover, the game program may be stored in a disk-like storage medium detachably inserted in the game machine, such as an optical disk or a magnetic disk.

While the invention has been described in detail, the foregoing description is in all aspects illustrative and not restrictive. It is understood that numerous other modifications and variations can be devised without departing from the scope of the invention.

What is claimed is:

1. A game processing system that enables a player to play a plurality of games interrelated to each other, said game processing system comprising:

a game program storage for storing a plurality of game programs for executing a plurality of types of different games interrelated to each other;

a game progress data storage for storing backup data corresponding to each of the plurality of types of different games and representing the progress of each of the plurality of types of different games played;

a controller for providing instructions to select and start one of the plurality of game programs stored in said game program storage, and for controlling the progress of a game corresponding to the selected game program;

a processor for determining, when said controller provides the instruction to start game corresponding to the selected game program, whether game progress data is stored for another game related to the game corresponding to the selected game program, said processor being operable to change part of the selected game program based on a decision related to the presence or absence of said game progress data for another related game, said processor being operable to read the changed game program; and an image processor for carrying out image processing for the changed game program.

2. The game processing system as claimed in claim 1, wherein said game progress data storage includes a clear information storage area for storing clear related information about any cleared game, and said processor being operable to decide whether the clear related information is written in the progress data for another game related to the selected game.

3. The game processing system as claimed in claim 1, wherein each of the game programs stored in said game program storage includes a plurality of program units each relating to a different game scenario, and said processor being operable to compose the game program by selecting a program unit defining a game scenario based in part on progress data for another game.

4. The game processing system according to claim 1, wherein said game program storage is a readable and writable nonvolatile memory larger in capacity than each of the games;

said nonvolatile memory storing game programs for at least two different types of games that are interrelated to each other and played in a predetermined order; and said game progress storage having a storage capacity capable of storing the progress related backup data for each of said at least two different types of games.

5. The game processing system according to claim 1, wherein said game program storage stores the plurality of game programs interrelated to each other for games that are same in game genre and at least one hero character but at least in part different in scenario.

6. A game information storage medium for use with a controller and game processor, the game information storage medium comprising:

a game program storage medium for storing a plurality of game programs for creating a plurality of different types of games interrelated to each other and executable by said game processor; and a backup data storage medium for writably and readably storing backup data indicative of the progress of each of the different types and games, wherein said game program storage medium storing a plurality of programs executable by said game processor including:

a decision program for deciding whether backup data is stored for one of said different types of games another game related to another of said different types of games selected using said controller;

a change program for changing part of the game program for a selected game, based on a decision made under the control of said decision program relating to the backup data;

a read control program for reading said changed game program;

an image processing program for carrying out image processing for the game program read by said read control program and for generating a display image.

7. A medium storing a game program for controlling a game processor that enables a player to play a plurality of different types of games interrelated to each other, said game program when executed by said game processor controlling the operations of:

storing backup data as to progress of each of the different types of games;

providing an instruction for selecting one of the plurality of game programs, starting and controlling the play of a selected game;

deciding whether the backup data is stored for another game related to the selected game;

changing part of the selected game program, based on the backup data;

reading said changed game program; and carrying out image processing for said read game program and for generating a display image in accordance with the changed game.

8. The game processing system according to claim 1, wherein said game program storage is detachably connected to said processor.

9. The game processing system according to claim 8, wherein game program storage is contained within a game cartridge.

10. The game processing system according to claim 8, wherein said program storage is a memory card.

11. The game processing system according to claim 8, wherein said program storage is a disk.

12. The game processing system according to claim 8, wherein said backup data storage is accommodated in a common housing with said program storage.

13. The game processing system according to claim 6, wherein said game program storage medium is accommodated in a housing detachably inserted in the game processor.

14. The game processing system according to claim 13, wherein said housing forms a game cartridge.

15. The game processing system according to claim 13, wherein said program storage is a memory card.

16. The game processing system according to claim 13, wherein said program storage is a disk.

17. The game processing according to claim 13, wherein said backup data storage is accommodated in a common housing with said program storage.

18. For use with a memory medium storing at least one game program for controlling a game processor that enables a player to play a plurality of different games interrelated to each other, a method of operating said game processor comprising the steps of:

storing a plurality of game programs for playing a plurality of different types of games interrelated to each other;

storing game progress data as to the progress of each of the different types of games;

selecting one of the plurality of game programs;

accessing game progress data for another game related to the selected game; and changing part of the selected game program in response to said progress data.

19. A method according to claim 18, further including the step of storing clear related information about any cleared game.

20. A method according to claim 19, further including the step of determining whether the clear related information is written in the progress data for another game related to the selected game.

21. A method according to claim 18, further including the steps of storing as part of a game program a plurality of program units each relating to a different game scenario, and dynamically composing the game program by selecting a program unit defining a game scenario based in part on progress data for another game.

22. A method according to claim 18, wherein said step of storing a plurality of game programs includes the step of storing game programs for at least two games that are interrelated to each other and played in a predetermined order; and wherein said step of storing game progress data includes the step of storing the progress related backup data for each of said at least two games.

23. A method according to claim 18, wherein the plurality of game programs interrelated to each other includes games that are same in game genre and at least one hero character but at least in part different in scenario.

24. For use with a memory medium storing game programs for controlling a game processor that enables a player to play a plurality of different types of games interrelated to each other, a method of operating said game processor comprising the steps of:

storing a plurality of said game programs interrelated to each other; wherein each game program includes a plurality of program units each relating to a different game scenario;

storing game progress data as to the progress of each of the games;

selecting one of the plurality of game programs;

accessing game progress data for another game related to the selected game; and dynamically changing the game program by selecting a program unit defining a game scenario based in part on progress data for another game.

25. A method according to claim 24, further including the step of storing clear related information about any cleared game.

26. A method according to claim 25, further including the step of determining whether the clear related information is written in the progress data for another game related to the selected game.

27. A method according to claim 24, wherein the plurality of game programs interrelated to each other includes games that are same in game genre and at least one hero character but at least in part different in scenario.

28. A game processing system that enables a player to play a plurality of different types of games interrelated to each other, said game processing system comprising:

a game program storage for storing a plurality of game programs for playing a corresponding plurality of different types of games interrelated to each other;

game progress data storage for storing backup data representing the progress of each of the plurality of different types of games played;

a controller for providing an instruction for selecting one of the plurality of game programs stored in said game program storage, and for controlling the starting and playing a game corresponding to the selected game program;

a processor for determining, when said controller provides the instruction for starting the selected game, whether the game progress data is stored for another game related to the selected game;

said processor being operable to change part of the selected game program, based on a decision related to said progress data for another related game;

said processor being operable to read said changed game program; and an image processor for carrying out image processing for the changed game program, wherein said game progress data storage includes a clear information storage area for storing clear related information about any cleared game, and said processor being operable to decide whether the clear related information is written in the progress data for another game related to the selected game.

29. A game processing system that enables a player to play a plurality of different types of games interrelated to each other, said game processing system comprising:

a game program storage for storing a plurality of game programs for playing a corresponding plurality of different types of games interrelated to each other;

game progress data storage for storing backup data representing the progress of each of the plurality of different types of games played;

a controller for providing an instruction for selecting one of the plurality of game programs stored in said game program storage, and for controlling the starting and playing a game corresponding to the selected game program;

a processor for determining, when said controller provides the instruction for starting the selected game, whether the game progress data is stored for another game related to the selected game;

said processor being operable to change part of the selected game program, based on a decision related to said progress data for another related game;

said processor being operable to read said changed game program; and an image processor for carrying out image processing for the changed game program, wherein each of the game programs stored in said game program storage includes a plurality of program units each relating to a different game scenario, and said processor being operable to compose the game program by selecting a program unit defining a game scenario based in part on progress data for another game.

* * * * *